G. GIOVANNA.
COMBINED RANGE AND BOILER.
APPLICATION FILED JUNE 30, 1911.

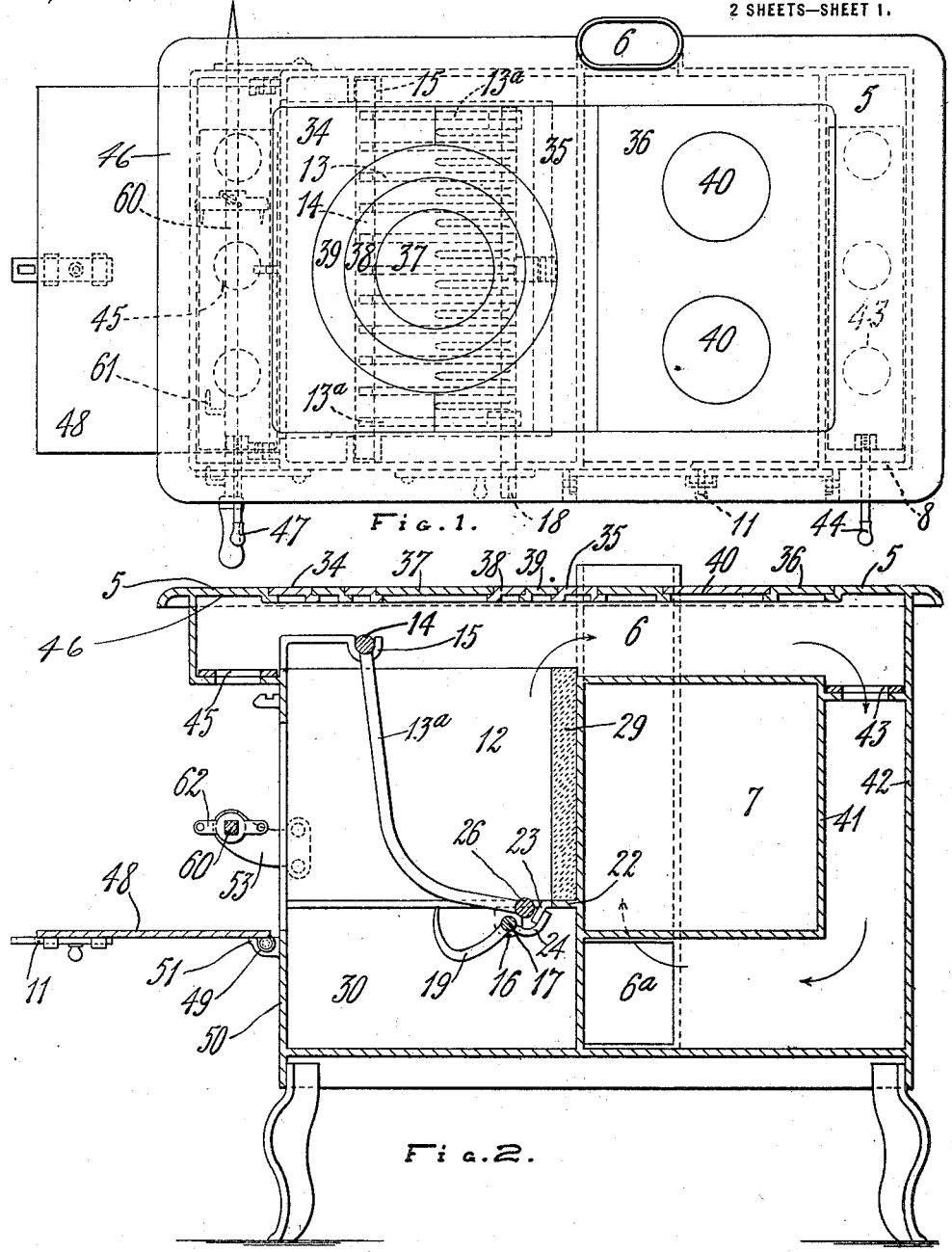

1,206,527.

Patented Nov. 28, 1916.
2 SHEETS—SHEET 2.

WITNESSES:
H. E. A. Raube
J. F. Mothershead

INVENTOR
George Giovanna
By Griffins Bernhard
ATTORNEYS.

UNITED STATES PATENT OFFICE.

GEORGE GIOVANNA, OF NEW YORK, N. Y.

COMBINED RANGE AND BROILER.

1,206,527.

Specification of Letters Patent. Patented Nov. 28, 1916.

Application filed June 30, 1911. Serial No. 636,253.

*To all whom it may concern:*

Be it known that I, GEORGE GIOVANNA, a subject of the King of Italy, residing in the city of New York, borough of Manhattan, county and State of New York, having declared my intention of becoming a citizen of the United States, have invented a certain new and useful Combined Range and Broiler, of which the following is a specification.

This invention is a combined range and broiler, adapted for use in restaurants, hotels, etc., where cooking is done on a large scale, but more particularly for domestic use.

The invention is an improvement in cooking ranges wherein articles of food can be broiled, baked or otherwise cooked upon a single range, the necessary heat being furnished by a single grate.

One novel feature of construction is a range provided with a broiler exteriorly of said range, which broiler can be rotated either by hand or by a motor for the purpose of uniformly broiling the article.

The range is so constructed that the fire grate may be entirely relieved of its contents, or freed from surplus ashes, by a shaker operating between the bars of the grate, the said grate and shaker being operable exteriorly of the range. The grate, in the preferred construction, is made to swing so as to facilitate dumping.

The invention embodies, also, a range provided with a revoluble broiler positioned exteriorly of the range and coöperating with the grate thereof, said broiler comprising an impaling rod or knife, means coöperating with said rod or knife for clamping the article to be broiled on the rod or knife, and means for rotating the broiler.

Features of novelty in the construction of the range, other than those specified, will be apparent from the hereinafter description, taken in connection with the accompanying drawings.

Figure 3:
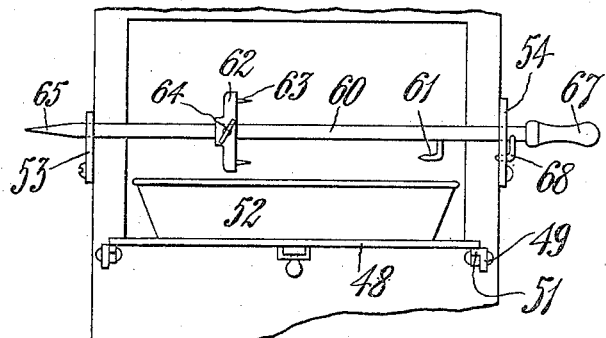
Figure 4:
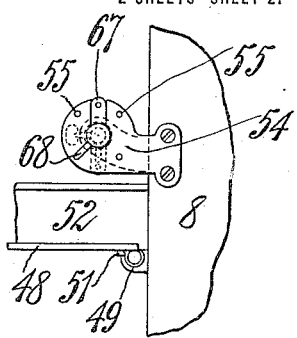
Figure 5:
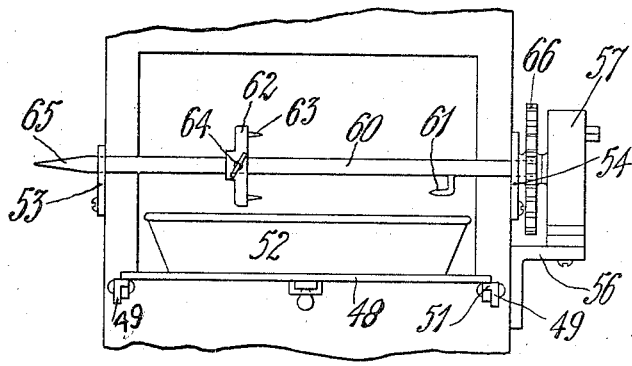
Figure 6:
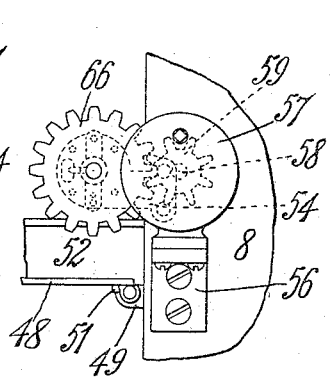
Figure 7:
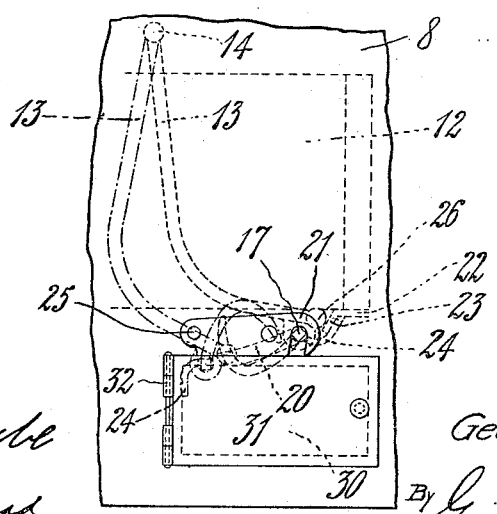

Referring to the drawings Figure 1 is a plan view of the range, the broiler, fire grate and dampers being indicated in dotted lines. Fig. 2 is a vertical sectional view taken centrally through the structure of Fig. 1 illustrating the position of the pivoted grate with relation to the oven and the broiler. Fig. 3 is a detail side elevation, illustrating the manually operated broiler in position on the range. Fig. 4 is an end view of the broiler shown in Fig. 3. Fig. 5 is a detail side elevation of a motor operated broiler. Fig. 6 is an end view of the mechanism for rotating the broiler shown in Fig. 5. Fig. 7 is a detail front elevation of the range, illustrating in dotted and in dot and dash lines the two positions of the pivoted grate, the dotted line showing it in operative position, and the dot and dash line illustrating the position of the grate when it is desired to free it of its contents.

Referring more particularly to Fig. 2, the range embodies frame 5, flue 6, and an oven 7. The oven is a box-like structure joined to the frame of the range, preferably at the front and rear walls thereof. As is customary, the oven is open at one side, *i. e.*, the side which is joined to the front wall 8, and this open side of the oven is closed by a door not shown, hinged to the front wall 8. The door is locked in its closed position by any suitable means, such, for example, as a sliding bolt, 11.

The range is provided with a fire box 12, within which is mounted a grate comprising a plurality of bars 13 which are joined at their respective ends by cross bars, the upper cross bar 14 being extended to form trunnions for the grate, and these trunnions turn in bearings 15 in the side walls of the range, near the top thereof. The bearings are preferably constructed to facilitate the easy removal of the trunnions. The bars of the grate are preferably straight for a portion of their length, the straight portions of which are slightly inclined toward the door which closes one side of the range, when said door is in its closed position against the side wall, the lower portion of said grate bars are then curved toward the oven to form the bottom of the fire chamber. Near the lower end of the curved bars 13, preferably on the end bars 13$^a$ of the grate, are bearings 16, in which bearings is pivotally mounted a rod 17, forming one element of the shaker. The rod is extended beyond one of the bearings, and the wall 8, and it is provided with a square or polygonal end 18. The rod 17 is provided with a plurality of curved arms or bars 19 which are arranged in alternate relation with respect to the grate bars 13. These arms 19 normally assume a position out of engagement with the bars 13, as shown in Fig. 2, but when it is desired to clear the grate of accumulated ashes, the rod 17 is rotated by means of a crank which engages the square or polygonal end 18, for the purpose of rocking the arms 19 between the grate bars 13 and removing the ashes and burned coals from the grate, thereby securing better combustion of fuel in the grate.

The front wall 8 of the range is shown in Fig. 7 as being provided with a slot 20, said slot being indicated in dotted lines. Through this slot passes one end portion of rod 17 forming an element of the shaker. When the grate and the shaker are in the dotted line position of Fig. 7 and in the full line position of Fig. 2, the grate is retained in said position by a locking member 21. This locking member is pivoted at 25 to the front wall 8 and near its free end the locking member is provided with a notch whereby the notched end of the locking member is adapted to drop over the protruding end of bar 17. When the grate and the shaker are in their normal operative positions and the notched end of the locking member is in engagement with the protruding end of the bar, 17, said locking member operates to retain the grate against pivotal movement within the grate chamber; but as the bar 17 passes loosely through the notch in the locking member it is manifest that the shaker can be rocked or turned by applying a suitable implement to the protruding end of the bar 17, after which the implement is operated to impart rocking movement to the bar 17 and the fingers of the shaker.

In this invention the grate is in the form of a basket, the upper part of which is provided with a bar 14, which bar is fitted in brackets 15, for the purpose of pivotally supporting the basket grate within the grate chamber in such manner that the grate can be swung within the grate chamber so as to assume a dumping position, and the grate can be removed bodily from the grate chamber. Furthermore, the shaker is carried by the grate at the lower part thereof, said shaker partaking of the pivotal movement of the grate within the chamber. The shaker remains connected with the grate so that it is withdrawable with the grate from the chamber, the grate and the shaker being insertible at will into the chamber or removable therefrom.

A shelf 22 extends from a wall of the oven 7, and is positioned between the fire box 12 and the ash pit of the range, said shelf 22 being provided with a foot piece 23 which coöperates with curved locking plate 24 carried by the rod 17 of the shaker, see Fig. 2. This locking plate 24 coöperates with the foot piece 23 in retaining the shaker in its normally inoperative position, as illustrated in Fig. 2, and by the dotted line in Fig. 7. It serves, also, as a lock against the pivotal movement of the grate when in the position shown in Fig. 2.

It is evident that the locking member 21 when engaged with rod 17 of the shaker, as shown in dotted lines in Fig. 7, retains the grate in its operative position, but the rod 17 may be rotated for operating the shaker in a manner to work the fingers 19 of said shaker in the spaces between the bars of the basket grate, whereby the surplus ashes from the bed of fuel may be discharged from the grate. By withdrawing the locking member from engagement with rod 17 the grate is free to swing within the grate chamber on the axis afforded by the rod 14 so that the grate will assume the position indicated by the dash and dot lines of Fig. 7. With the grate in this position the fuel can be dumped therefrom into the ashpit, after which the grate and shaker are restored to their normal positions, and the locking member 21 is positioned for its notched end to engage with the protruding end of rod 17. The grate is thus retained against pivotal movement within the grate chamber and by turning the shaker to the position shown in full lines in Fig. 2 the member 24 of the shaker will engage with the ledge 23 within the grate chamber, thus further locking the shaker and the grate against pivotal movement within the grate chamber. An ordinary fire brick 29 rests on the shelf 22 and is secured between the fire chamber and one wall of the oven 7. Access to the ash pit is obtained by the door 31, hinged at 32 to the front wall 8 of the range. The range is provided with a removable top, which is composed of a plurality of covers 34, 35, 36 and a plurality of lids 37, 38, 39 and 40, the lids 37, 38 and 39 being positioned one within the other and between the covers 34 and 35. The smoke and gases, resulting from combustion of materials in the fire grate, are conducted from the fire chamber around the top, one side, and the bottom of the oven to the flue 6$^a$, as will be clearly understood from Fig. 2.

Between the side wall 41 of the oven 7, preferably near the top thereof, and an end wall 42 of the range, is positioned a slidable damper 43, which is operated by a suitable handle 44. This damper operates to control the flow of smoke, gases and heated air from the fire chamber around the oven to the flue opening 6$^a$. A similar sliding damper 45 is positioned within the opposite end of the range, beneath the overhanging portion 46 of the top of the range. This damper 45 is operated by the handle 47 to admit cold air above the fire chamber and thereby regulate the temperature of the air which circulates around the oven. This damper 45 is employed when the broiler is in operation on the range, the broiler door 48 being open. Door 48 is hinged at 49 to an end wall 50 of the range, and it operates to close the fire chamber when it is desired to promote combustion, or when the broiler is not in use. The hinges 49 are provided with a suitable shoulder or stop 51, whereby the door will be limited in its outward movement beyond a predetermined point, and the door will thereby serve as a shelf, when opened to its full extent, upon which shelf or door, is adapted to be placed a drip pan 52.

Oppositely disposed brackets 53, 54 are positioned at the ends of the range, one bracket on each side of door 48, and upon these brackets is mounted a rotary broiler. Bracket 53 is of any suitable construction to receive an end of the broiler and support it during its rotation, but the bracket 54, in adition to having means for supporting the broiler, is provided with a plurality of apertures 55 to receive a locking arm of the broiler, to be hereinafter referred to. A bracket 56 is secured to the front wall 8 of the range, and upon this bracket may be mounted a motor 57, having a suitable shaft 58, on which is secured a gear 59, (Figs. 5 and 6). The motor is of any preferred construction, but I prefer to use a spring motor which slowly rotates the gear 59 and the broiler.

The broiler embodies an impaling rod 60 on which is formed a hook or prong 61, or a plurality of such prongs. The rod is provided, also, with a collar 62, slidably mounted thereon, said collar being provided with one or more prongs. The collar is adjustably fastened on the blade by a set screw, 64 whereby the prongs of the collar are adapted to coöperate with the prongs 61 for clamping the article to be broiled securely to the rod, and when these prongs are placed in position, the collar can be retained in its adjusted position by tightening the thumb screw 64. The rod is rounded near its ends to turn freely in the bracket 53, one end of the rod being pointed or sharpened, as at 65. The opposite end of the rod is provided with a gear 66, which is adapted to mesh with gear 59 of the motor, whereby the article to be broiled can be continuously rotated before the grate. However, in cooking certain foods it may be desirable to retain the article to be broiled in a fixed position before the grate for a definite length of time before revolving the broiler, and for such purposes I have provided a separate rod similar in all substantial particulars to the rod just described, except that it is not geared to the motor.

By reference to Figs. 3 and 4, it will be seen that in lieu of the gear 66, the separate rod is provided with an ordinary handle 67, and adjacent to this handle is a locking arm 68 which is adapted to fit into either of the apertures 55 in the bracket 54, and to retain the broiler in any one of a number of fixed positions before the grate. This broiler is manually turned by the handle 67 to the desired position before the grate, and the locking arm 68 can be inserted in any one of the plurality of apertures 55.

By reference to Fig. 2 it will be observed that the straight portion of the bars of the grate, present a substantially vertical or slightly inclined fire surface to the meat on the broiler.

It is not desired to limit the invention to a range in which coal or wood is consumed, for the reason that it may be employed with other forms of heating devices than the one illustrated and specifically described.

The operation of the range may be described as follows: Assuming that a fire is started in the grate, dampers 43 and 45 are regulated to control the circulation of gases and heated air around the oven. The lids may be utilized in any manner for cooking food substances upon the top of the range. In using the broiler, door 48 is opened to produce a shelf, and a drip pan 52 is positioned thereon beneath the space to be occupied by the broiler. The collar 62 is removed from the impaling rod, and the article to be cooked is impaled on the rod of the broiler until it is engaged by the prong 61, whereupon collar 62 is replaced upon the rod until its prongs 63 (which are disposed oppositely to prong 61) also engage the article to be broiled, set screw 64 being operated to secure the collar to the rod. If the hand operated broiler is employed, the rod is mounted upon brackets 53, 54, and the article to be roasted is retained in the desired position before the grate by inserting locking arm 68 into one of the apertures 55 of bracket 54. The position of the article impaled on the broiler, may be changed with relation to the grate, by manipulating the handle 67, thereby manually operating the broiler. When it is desired that the article to be broiled shall be continuously turned before the grate in order to properly cook the article, the broiler illustrated in Figs. 5 and 6 is employed, the broiler being mechanically rotated. The article to be cooked is secured on this broiler in the same manner as that used on the broiler of Figs. 3 and 4, just described, and the rod is mounted on the brackets 53, 54 so that the gear 66 of the broiler will mesh with the gear 59 of the motor shaft. The motor operates to slowly revolve the broiler, whereby the article to be roasted can be continuously turned before the grate. When the broiler is not in use, the door 48 is retained in its closed position.

Having thus fully described the invention, what I claim as new, and desire to secure by Letters Patent is:—

1. A stove embodying a grate chamber having an open front side, an upwardly extending grate positioned within said chamber for directing the heat toward said open side, a horizontal flue positioned intermediate the grate chamber and the stove top, said horizontal flue extending at the forward end portion thereof beyond the plane of the open front side of said chamber and said forwardly extended part of said flue having downwardly opening inlets positioned beyond said open front side of the chamber, a spit positioned exteriorly to the grate chamber, said spit being directly below the inlets to the forwardly extended part of the top flue whereby the smoke arising from the material on the spit is free to flow upwardly through the inlets and into the flue, and a damper positioned to open and close the inlets to said top flue.

2. A stove embodying a grate chamber the front side of which is open, a door for closing said open side of the chamber, said door being hinged to turn on a horizontal axis, and adapted to form a shelf for supporting a tray exteriorly to the grate chamber, an upwardly extending grate positioned within the chamber for directing heat toward the open front side of said chamber, a horizontal top flue positioned intermediate the stove top and the grate chamber, the forward part of said horizontal flue being extended beyond the open front side of the chamber and said forwardly extended part of the flue being provided with downwardly opening inlets positioned forwardly of the plane of the open side to said chamber, a spit exteriorly to the open front side of the chamber and below the forwardly extended part of the horizontal flue so that the smoke arising from the material on the spit is free to flow into the horizontal flue, and a sliding damper positioned within the horizontal flue for controlling the inlets thereto.

In testimony whereof I have signed my name to this specification in the presence of two subscribing witnesses.

GEORGE GIOVANNA.

Witnesses:
JAS. H. GRIFFEN,
H. I. BERNHARD.

Copies of this patent may be obtained for five cents each, by addressing the "Commissioner of Patents, Washington, D. C."